C. A. LOHR.
SYNCHRONOUS INDUCTION MOTOR.
APPLICATION FILED OCT. 29, 1906.
971,056.
Patented Sept. 27, 1910.
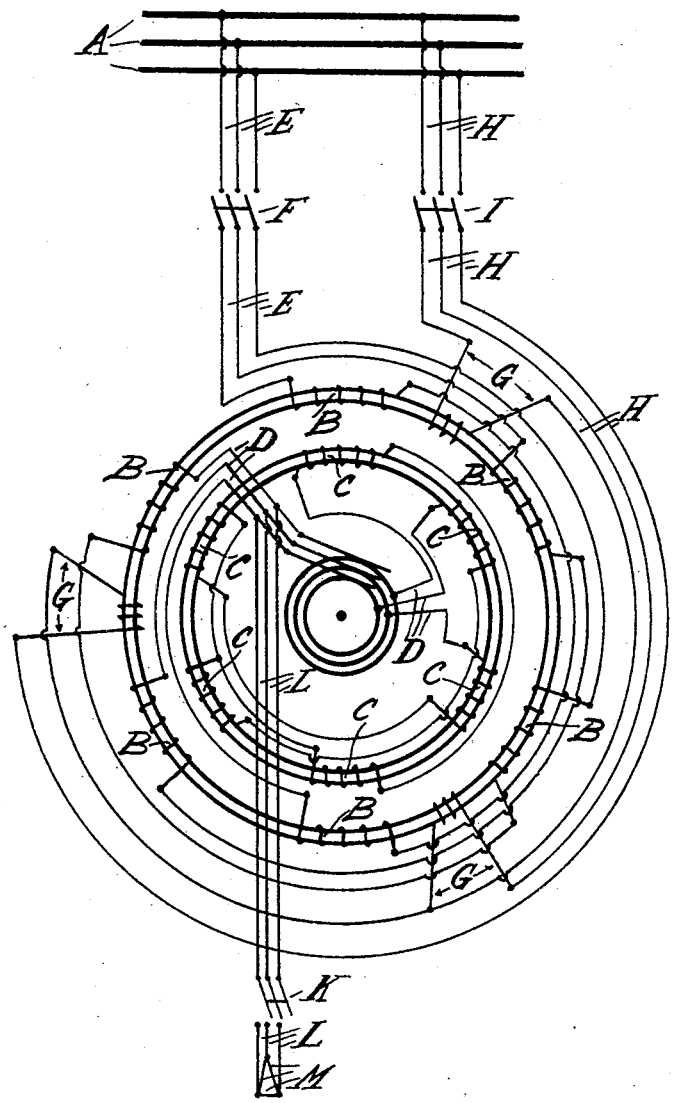
WITNESSES
J. C. Lee
O. M. Hermich
INVENTOR.
Carl A. Lohr
BY A. Miller Belfield
ATTORNEY.

UNITED STATES PATENT OFFICE.

CARL A. LOHR, OF CHICAGO, ILLINOIS.

SYNCHRONOUS INDUCTION-MOTOR.

971,056.  Specification of Letters Patent. Patented Sept. 27, 1910.

Application filed October 29, 1906. Serial No. 341,057.

*To all whom it may concern:*

Be it known that I, CARL A. LOHR, a subject of the Emperor of Germany, residing at Chicago, in the county of Cook and State of Illinois, have invented a certain new and useful Improvement in Synchronous Induction-Motors, of which the following is a full, clear, concise, and exact description, reference being had to the accompanying drawings, forming a part of this specification.

My invention relates to alternating current rotary field motors, and more particularly to motors of this class in which both members of the motor, viz., stator and rotor, are electrically connected with an alternating current source, thus giving a synchronous speed which is equal to the sum or the difference of the rotary fields produced in the two motor members. I have called this class of alternating current motors "synchronous induction motors" and this term is used in this specification to define these machines.

The object of the present invention is to provide means for starting synchronous induction motors up to their synchronous speed. I have disclosed one method of this kind in my application for a patent, filed September 7, 1905, Serial No. 277,336. This method, as well as the one described herein, are applicable if the synchronous induction motor is to be started up without load or at least without considerable load, while in another application Serial No. 341,056 filed simultaneously herewith, I have developed a method of starting up such motors with full load and with maximum torque at starting.

In the accompanying drawing the figure is a diagrammatic illustration of a synchronous induction motor embodying my invention.

Referring to the drawing, A is an alternating current line generally three-phase.

B is the stator-winding of an induction motor, said winding being four-pole polyphase. C is the rotor also having four-pole polyphase windings which are connected with the polyphase windings B of the stator by the conductors D and by means of collector-rings and brushes, as shown, in the manner indicated in the drawing, so that the rotary magnetic fields in the members of the motor, rotate in opposite directions. Also the windings of the stator and rotor are connected in series.

The conductors E connect the alternating current line with the terminals of the stator windings B by means of the switch F, when this switch is closed. Furthermore the stator of this induction motor has an auxiliary two-pole polyphase winding G which is connected by the conductors H and by means of the switch I, when closed, with the alternating current line A. This auxiliary winding G needs to have only a few turns just to produce a rotary magnetic field strong enough to start the motor without load up to the desired speed. Also this auxiliary winding may either be laid in the same slots as the main winding, or if this would not seem practical, in some cases it may be put in separate holes.

The polyphase windings B of the stator and C of the rotor, would produce an alternating field in the motor members, when the switch F is closed, when the motor is at rest, as the two magnetic fields produced by said windings B and C rotate in opposite directions and produce as a resultant field an alternating field which is not able to start the motor from rest. The polyphase winding G (the auxiliary winding) ought to have half as many poles as the windings B and C, and is connected with the alternating current line A, so that the rotary magnetic field produced by said auxiliary winding would rotate in the same direction as the magnetic field produced by the stator winding B, but with twice the speed as the rotary field produced by the windings B. The operation of the motor then would be as follows: First switch I is closed, thus producing in the stator a rotary field, the speed of which is determined by the number of poles of the auxiliary winding G and the frequency of the alternating currents of the line A. For instance, if the frequency of the alternating current line be 25 cycles per second, and the number of poles of the auxilary winding G be 2, the speed of the rotary field produced by the auxiliary winding would be 1500 revolutions per minute. If switch F is open, the motor will speed up with a small starting torque nearly to the speed of the rotary field produced in the stator by the auxiliary winding G. The rotor does not need to have a winding closed upon itself, as the motor will speed up as a "hysteresis motor". If now the switch I is opened and simultaneously switch F is closed, the motor will act as a "synchronous induction motor", and if the stator windings B and the rotor windings C have twice the number of poles as the auxiliary winding G, as shown in the drawing, the motor will give a synchronous speed equal to the speed of the rotary field produced by the auxiliary winding G. A synchronous speed of 1500 revolutions per minute will be produced if the stator windings B and rotor windings C are wound for four poles. The speed of the rotary fields produced in either member will then be 750 revolutions per minute, and as these rotary fields rotate in opposite directions, the synchronous speed of the motor is the sum of the rotary fields, i. e., 1500 revolutions per minute.

I have also shown a switch K with associated conductors L and M, by which the rotor can be short-circuited during the first half of the starting period, by closing simultaneously switch F, thus also operating the motor as a four-pole asynchronous induction motor. This is not necessary, as the motor will start without it, but it is desirable as it increases the starting torque. Thus in brief, the synchronous speed of an induction motor which operates by simultaneously connecting both members of the motor with the alternating current line and rotating the magnetic rotary fields in opposite directions, is obtained by operating the induction motor first asynchronously with a rotary field speed equal or approximately equal to said synchronous speed of the induction motor.

It may be noticed that the windings B and C on the stator and rotor of the motor may also be connected in parallel, and that the connection between the line and the rotor in particular may be made by means of a transformer in case it may be desirable to use a lower voltage in the rotor, as I have pointed out in my application Serial No. 299,115, filed Feb. 2, 1906. Also the same result may be obtained by reducing the number of poles of the stator windings to one-half during the starting period.

The advantages of the motor herein described, are pointed out in other specifications and are mainly its being compensated and its characteristic high speed. On account of the first feature, this motor may also be called a "compensated induction motor".

What I claim is:—

1. In combination with an alternating-current motor both members of which have alternating-current windings, an auxiliary polyphase winding on one member of said motor, said auxiliary winding being able to produce a magnetic rotary field of half the number of poles said other windings would produce, means for connecting said auxiliary winding to an alternating current source, and means for connecting said alternating current windings with an alternating-current source simultaneously, so that the magnetic fields in both members of said motor rotate in opposite directions.

2. In combination with an alternating-current motor, both members of which have polyphase windings, an auxiliary polyphase winding on one member of said motor for starting same, said auxiliary winding being able to produce a magnetic rotary field, the speed of which is equal or approximately equal to the synchronous motor-speed obtainable by supplying alternating currents to both members of said motor when operating normally, and switching instrumentalities for electrically operatively connecting at will said auxiliary polyphase winding alone or said polyphase windings on both members of said motor simultaneously.

3. In combination with an alternating current motor, both members of which have polyphase main windings, an additional polyphase winding on one member of said motor for starting same, said additional polyphase winding having a smaller number of poles than said polyphase main windings, means for electrically connecting said additional polyphase winding to an alternating current source to start said motor when said polyphase main windings are open, and means for electrically connecting said polyphase main windings simultaneously to an alternating current source to operate said motor synchronously.

4. In combination with an alternating current motor, both members of which have polyphase main windings, an additional polyphase winding on the stationary member of said motor for starting same, said additional polyphase winding having a smaller number of poles than said polyphase main windings, means for connecting said motor to an alternating current source to electrically operate said additional polyphase winding for starting said motor, said main polyphase windings being open, and means for electrically connecting said polyphase main windings simultaneously to an alternating current source, thereby to synchronously operate said motor.

In witness whereof, I hereunto subscribe my name this 24th day of October A. D. 1906.

CARL A. LOHR.

Witnesses:
A. MILLER BELFIELD,
I. C. LEE.